United States Patent
Chen et al.

(10) Patent No.: US 10,081,137 B2
(45) Date of Patent: Sep. 25, 2018

(54) DISTRIBUTED PRINTING METHOD OF 3D PRINTER

(71) Applicants: XYZPRINTING, INC., New Taipei (TW); KINPO ELECTRONICS, INC., New Taipei (TW)

(72) Inventors: Chung-Ju Chen, New Taipei (TW); Hsueh-Kuan Shih, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 330 days.

(21) Appl. No.: 15/046,488

(22) Filed: Feb. 18, 2016

(65) Prior Publication Data
US 2017/0203518 A1   Jul. 20, 2017

(30) Foreign Application Priority Data
Jan. 19, 2016 (CN) .......................... 2016 1 0033842

(51) Int. Cl.
| | |
|---|---|
| B29C 67/00 | (2017.01) |
| B29C 64/386 | (2017.01) |
| B29C 64/112 | (2017.01) |
| B29C 64/209 | (2017.01) |
| B29C 64/153 | (2017.01) |
| B29C 64/106 | (2017.01) |
| B33Y 10/00 | (2015.01) |
| B33Y 50/02 | (2015.01) |

(52) U.S. Cl.
CPC ........ *B29C 67/0088* (2013.01); *B29C 64/386* (2017.08); *B29C 64/106* (2017.08); *B29C 64/112* (2017.08); *B29C 64/153* (2017.08); *B29C 64/209* (2017.08); *B33Y 10/00* (2014.12); *B33Y 50/02* (2014.12)

(58) Field of Classification Search
CPC . B29C 67/0088; B29C 64/106; B29C 64/112; B29C 64/153; B29C 64/209; B29C 64/386; B29C 64/393
USPC .................................................. 264/129, 308
See application file for complete search history.

(56) References Cited

U.S. PATENT DOCUMENTS

| | | | |
|---|---|---|---|
| 6,375,874 B1 * | 4/2002 | Russell .................. | B29C 41/12 264/109 |
| 2005/0225007 A1 * | 10/2005 | Lai ..................... | G05B 19/4099 264/308 |

* cited by examiner

*Primary Examiner* — Seyed Masoud Malekzadeh
*Assistant Examiner* — Lawrence D. Hohenbrink, Jr.
(74) *Attorney, Agent, or Firm* — Chun-Ming Shih; HDLS IPR Services (57) ABSTRACT

A distributed printing method of a powder-bed type 3D printer is present. The method first generates, for each printing layer of a 3D model file, a color image which is applied to print an outer contour part and a non-color image which is applied to print an internal structure part. The method then calculates replacing information according to a default adjusting module, and adjusts color information of the color image and adhesive information of the non-color image based on the replacing information. Finally, the method combines the adjusted color image and non-color image for generating a final printing image, and executes printing according to the final printing image.

9 Claims, 6 Drawing Sheets

DISTRIBUTED PRINTING METHOD OF 3D PRINTER

BACKGROUND OF THE INVENTION

1. Technical Field

The technical field relates to a printing method, and specifically to a printing method of a powder-bed type 3D printer.

2. Description of Prior Art

Figure 1:
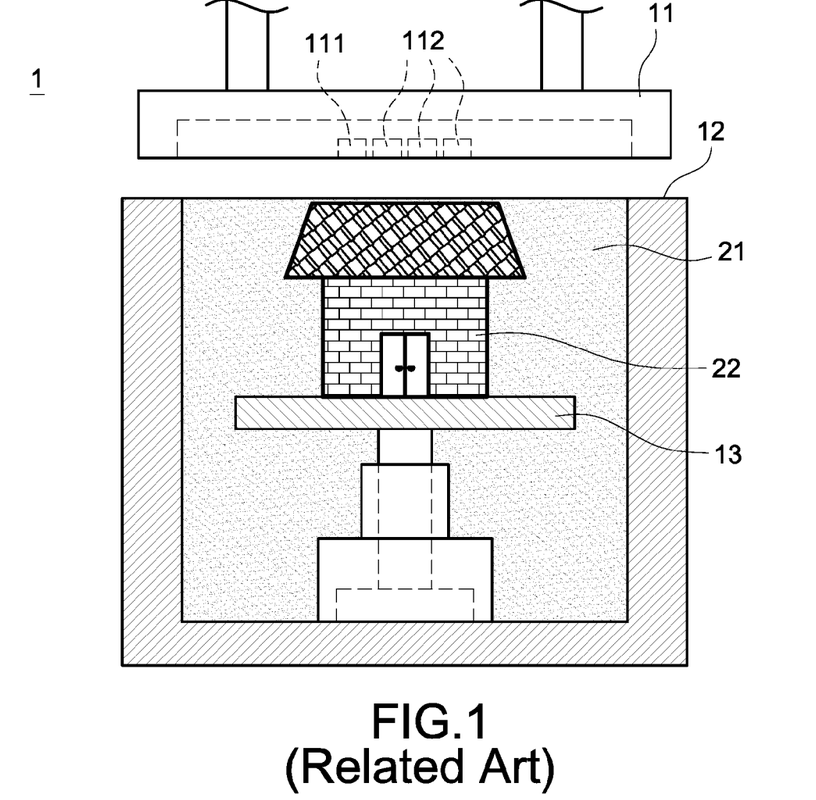
FIG. 1 is a schematic diagram of a powder-bed type 3D printer of related art.

FIG. 1 is a schematic diagram of powder-bed type 3D printer of related art. FIG. 1 discloses a powder-bed type 3D printer (refers to as 3D printer 1 hereinafter), the 3D printer 1 comprises a sprayer 11, a working plane 12 and a forming platform 13 below the working plane 12, wherein the sprayer 11 comprises an adhesive nozzle 111 for jetting adhesive and multiple color nozzles 112 for respectively jetting color-inks corresponding to different colors.

The powder-bed type 3D printing technology in the related art basically spreads a layer of powder 21 upon the forming platform 12, uses the color nozzles 112 to respectively jet different colors' inks to change the powder's color, and uses the adhesive nozzle 111 to jet adhesive to make the layer of powder 21 coheres as a formed subject 22.

Figure 2:
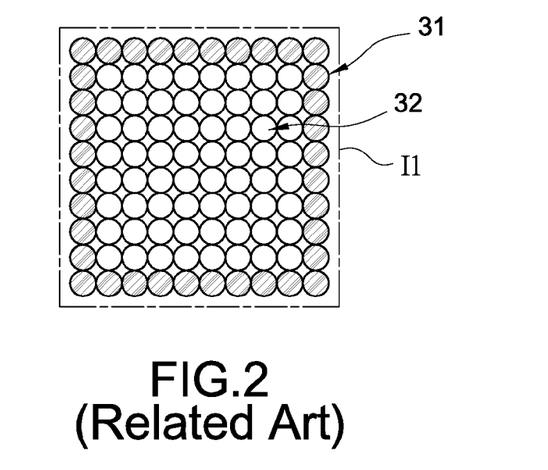
FIG. 2 is a schematic diagram of printing image of related art.

Please also refer to FIG. 2, which is a schematic diagram of printing image of related art. The formed subject 22 is constituted by stacking multiple printing layers, where each printing layer is respectively corresponding to one frame of printing image I1. As shown in FIG. 2, each printing image I1 mainly comprises color information 31 which is applied to an outer contour part of the printing layer and adhesive information 32 which is applied to an internal structure part of the same printing layer. In particularly, when printing the printing layer, the 3D printer 1 controls the adhesive nozzle 111 to jet adhesive at indicated position(s) according to the adhesive information 32 of the printing image I1, and controls the color nozzles 112 to respectively jet corresponding color inks at indicated position(s) according to the color information 31 of the printing image I1.

For stablizing the formed subject 22, the adhesive is always jetted at the structure part inside the formed subject 22. On the other hand, the outer contour part of the formed subject 22 is visible, so the color inks upon the outer contour part will be chosen and jetted corresponding to the colors recorded in the original 3D module file.

As mentioned above, the 3D printer 1 only uses a little color inks when printing the contour of the formed subject 22. Accordingly, the requirement of the adhesive is much higher than that of the color inks in the printing method of related art. In other words, the utility rate of the adhesive nozzle 111 is much higher than that of the color nozzles 112.

Because the utility rate of the adhesive nozzle 111 is much higher than that of the color nozzles 112, the damage rate of the adhesive nozzle 111 is also higher than that of the color nozzles 112. Besides, for effectively narrowing the size of the 3D printer 1, some technologies in related art adopted by industries integrate the adhesive nozzle 111 and the color nozzles 112 into a single sprayer 11, and the adhesive nozzle 111 and the color nozzles 112 of the sprayer 11 cannot be disassembled alone. In this case, the entire sprayer 11 needs to be changed if the adhesive nozzle 111 is out of work, and it may discourage the users from using it.

Furthermore, the aforementioned 3D printer 1 basically adopts powder-bed type 3D printing technology, if the environment is filled of the powder 21, the sprayer 11 of the 3D printer 1 is easily obstructed by the powder 21 floating in the environment. Also, because the utility rate of the color nozzles 112 is low, if the color nozzles 112 are not controlled to jet properly to keep themselves moist, the color nozzles 112 are easily damaged due to the obstruction of the powder 21.

SUMMARY OF THE INVENTION

The disclosure is directed to a distributed printing method of powder-bed type 3D printer, which can adjust and balance the utility rate of each nozzle of the 3D printer in order to extend each nozzle's life.

In one of the exemplary embodiments, the distributed printing method first generates, for each printing layer of a 3D model file, a color image which is applied to print an outer contour part and a non-color image which is applied to print an internal structure part. The method then calculates replacing information according to a default adjusting module, and adjusts color information of the color image and adhesive information of the non-color image based on the replacing information. Finally, the method combines the adjusted color image and non-color image for generating a final printing image, and executes printing according to the final printing image. The distributed printing method disclosed in this embodiment adjusts and balances the jetting frequency of the multiple color nozzles and the adhesive nozzle of the 3D printer, so as to expend these nozzles' life.

According to the distributed printing method of the present disclosure, the color nozzles jetting color inks and the adhesive nozzle jetting adhesive are controlled and used averagely, and the problem in related art that the using amount of adhesive is much higher than that of color inks of the powder-bed type 3D printer and the life of the adhesive nozzle is much shorter than that of the color nozzles is solved.

Moreover, to balance the utility rate of the color nozzles and the adhesive nozzle by controlling the color nozzles to jet properly during the execution of printing can also solve the problem that the color nozzles may be obstructed by the powder floating in the environment and damaged because their low jetting frequency.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 3:
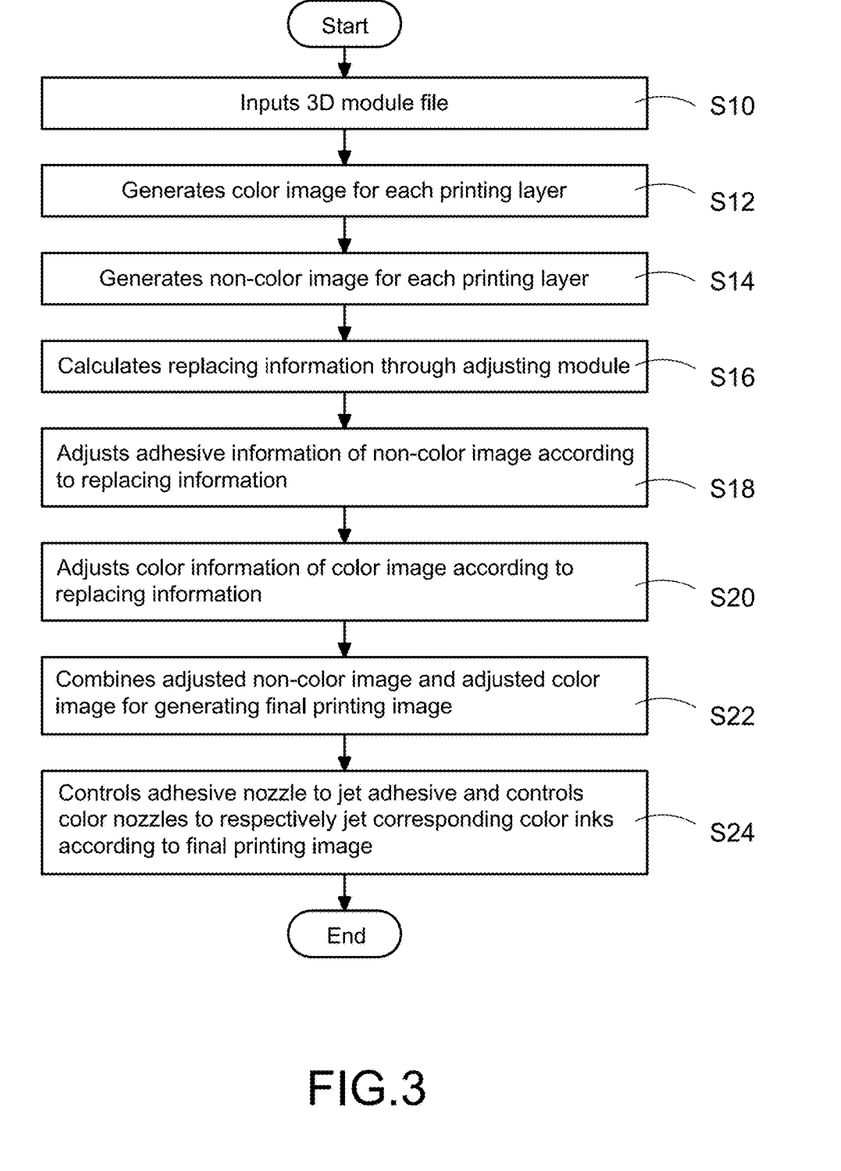
FIG. 3 is a printing flowchart of a first embodiment according to the present disclosure.

FIG. 3 is a printing flowchart of a first embodiment according to the present disclosure. The first embodiment discloses a distributed printing method, which is adopted by a powder-bed type 3D printer 1 (refers to as printer 1 hereinafter) as shown in FIG. 1.

As shown in FIG. 1, the printer 1 comprises a sprayer 11, which is constituted of an adhesive nozzle 111 applied to jet adhesive and multiple color nozzles 112 applied to respectively jet color inks in different colors. In this embodiment, the amount of the multiple color nozzles 112 is three for example, and these three color nozzles 112 are respectively used to jet cyan ink, magenta ink and yellow ink, but not limited thereto.

It should be mentioned that in one of the exemplary embodiments, the adhesive nozzle 111 and the color nozzles 112 are respectively assembled inside a housing (not shown in FIG. 1) of the sprayer 11, and each nozzle can be dismantled and changed from the sprayer 11 arbitrarily according to user demand. In other one of the exemplary embodiments, the adhesive nozzle 111 and the color nozzles 112 are integrated together and each nozzle inside the sprayer 11 cannot be dismantled individually.

The distributed printing method in the first embodiment is to adjust and balance the utility rate of the adhesive nozzle 111 and the color nozzles 112 via an adjusting module (not shown) of the printer 1. In particular, the using amount of the adhesive is much more than that of the color inks in printing a 3D module (such as the formed subject 22 shown in FIG. 1), so the utility rate (i.e., the jetting frequency) of the adhesive nozzle 111 is much higher than that of the color nozzles 112, that is way the damage rate of the adhesive nozzle 111 is also higher than that of the color nozzles 112.

In one of the exemplary embodiments, if the adhesive nozzle 111 cannot be dismantled from the sprayer 11 alone for changing, the entire sprayer 11 needs to be changed whenever the adhesive nozzle 111 is out of work, even if parts or all of the color nozzles 112 are regular, which is wasted. In this embodiment, the distributed printing method effectively reduces the utility rate of the adhesive nozzle 111 in order to extend life of the adhesive nozzle 111.

Besides, the utility rate of the color nozzles 112 is relatively low, so the color nozzles 112 are easily obstructed by the powder floating in the environment (such as the powder 21 shown in FIG. 1) and damaged. In this embodiment, the distributed printing method controls the color nozzles 112 to jet properly in order to keep the color nozzles 112 moist during the execution of printing, so as to reduce the probability that the color nozzles 112 may be obstructed by the powder 21 and damaged. Therefore, the distributed printing method can also extend life of the color nozzles 112.

As shown in FIG. 3, to adopt the distributed printing method, the printer 1 first inputs a 3D module file of the formed subject 22 through wired or wireless approach (step S10). In this embodiment, the input 3D module file (such as a CAD file) is sliced by a processor (not shown) of the printer 1 via the execution of a slice process to generate a plurality of printing layers, wherein the slice process can be, for example, a stereolithography (SLA) slice process, but not limited. The slice process is a regular technical skill in this technical field, no more discussion is needed here.

Next, the printer 1 generates a color image for each printing layer respectively (step S12), and also generates a non-color image for each printing layer respectively at the same time (step S14). In other words, if the 3D module file is sliced into n-layers (which means the amount of the printing layer is n), then the printer 1 will generates n frames of color image (such as color image I2 shown in FIG. 4A) and n frames of non-color image (such as non-color image I3 shown in FIG. 4B). In the following embodiments, only one single printing layer, and one shot of the color image I2 and the non-color image I3 in the printing layer will be took into an example for further discussion.

Figure 4A:
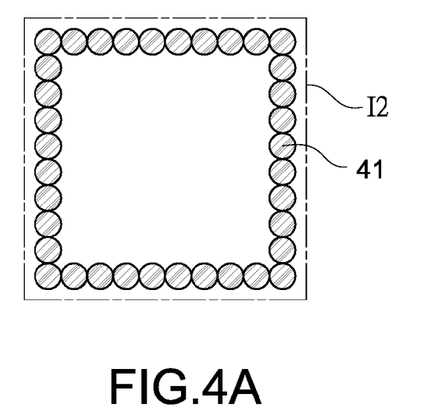
FIG. 4A is a schematic diagram of color image of a first embodiment according to the present disclosure.
Figure 4B:
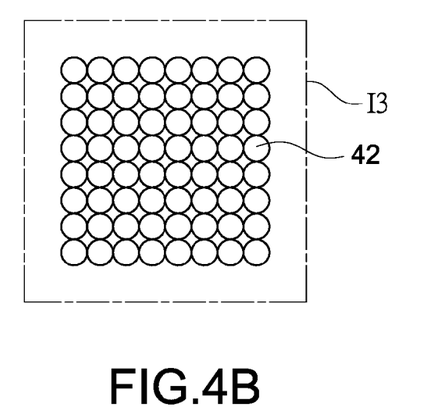
FIG. 4B is a schematic diagram of non-color image of a first embodiment according to the present disclosure.

FIG. 4A is a schematic diagram of color image of a first embodiment according to the present disclosure. FIG. 4B is a schematic diagram of non-color image of a first embodiment according to the present disclosure. In this embodiment, the color image I2 is applied for an outer contour part of the printing layer and comprises color information 41. The non-color image I3 is applied for an internal structure part of the printing layer and comprises adhesive information 42.

The printer 1 executes printing according to a printing image I1 as shown in aforementioned FIG. 2, wherein the printing image I1 is constituted of the color image I2 and the non-color image I3, wherein the color information 41 of the color image I2 and the adhesive information 42 of the non-color image I3 are not overlapped. In particularly, when executing printing, the printer 1 controls the color nozzles 112 respectively to jet corresponding color inks based on the color information 41 of the color image I2 in order to change the color of the outer contour part of the printing layer. Also, the printer 1 controls the adhesive nozzle 111 to jet adhesive based on the adhesive information 42 of the non-color image I3 in order to make the powder 21 of the internal structure part of the printing layer cohere.

Looking back to FIG. 3, after the color image I2 and the non-color image I3 are generated, the printer 1 calculates and generates replacing information through the default adjusting module (step S16). Next, the printer 1 adjusts the adhesive information 42 of the non-color image I3 according to the replacing information (such as replacing information 43 shown in FIG. 4C) (step S18), and adjusts the color information 41 of the color image I2 according to the replacing information 43 (step S20).

As shown in FIG. 4A and FIG. 4B, the color information 41 is used to indicate the positions of the color inks distributed in the printing layer, and the adhesive information 42 is used to indicate the positions of the adhesive distributed in the printing layer. In this embodiment, the replacing information 43 is used to indicate multiple adjusted target positions (such as adjusted target positions 431 shown in FIG. 4C) distributed in the printing layer.

Figure 4C:
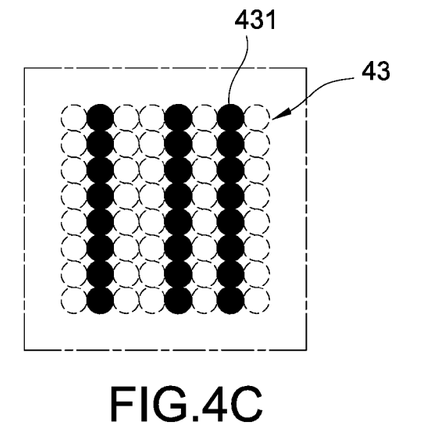
FIG. 4C is a schematic diagram showing replacing information of a first embodiment according to the present disclosure.

Please also refer to FIG. 4C. FIG. 4C is a schematic diagram showing replacing information of a first embodiment according to the present disclosure. In this embodiment, the adjusting module is preset with an adjusting ratio and comprises a distributing algorithm for calculating the multiple adjusted target positions 431. In the aforementioned step S16, the printing 1 obtains the positions of the adhesive distributed in the printing layer according to the adhesive information 42 of the non-color image I3, and generates the replacing information 43 upon parts of the positions distributed with the adhesive. In other words, the multiple adjusted target positions 431 are overlapped with parts of the distributed positions of the adhesive. In one of the exemplary embodiments, the adjusting ratio for generating the adjusted target positions 431 is about one-third of the distributed positions of the adhesive, but not limited thereto.

The distributed printing method is to adjust the using amount of the adhesive and the color inks according to the replacing information 43. In particularly, in the aforementioned step S18, the method mainly deletes parts of the adhesive information 42 upon the multiple adjusted target positions 431 of the non-color image I3 according to the content of the replacing information 43. In the aforementioned step S20, the method mainly increases the color information 41 upon the multiple adjusted target positions 431 of the color image I2 according to the content of the replacing information 43.

Figure 4D:
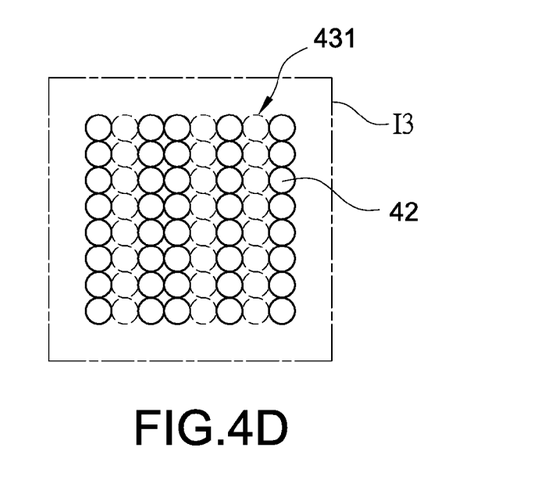
FIG. 4D is a schematic diagram of adjusted non-color image of a first embodiment according to the present disclosure.
Figure 4E:
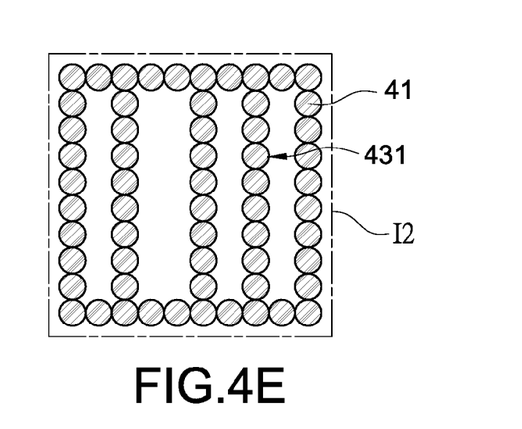
FIG. 4E is a schematic diagram of adjusted color image of a first embodiment according to the present disclosure.
Figure 4F:
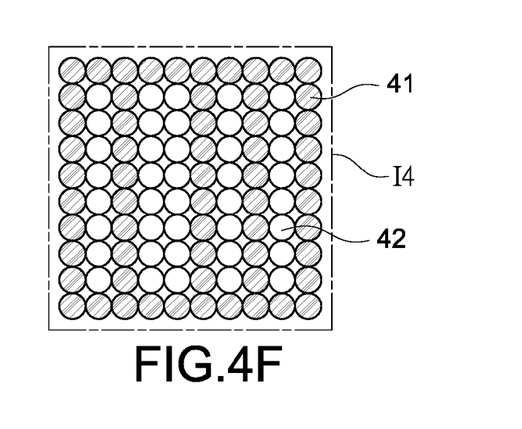
FIG. 4F is a schematic diagram of final printing image of a first embodiment according to the present disclosure.

Refer to FIG. 4D, FIG. 4D and FIG. 4F simultaneously, wherein FIG. 4D is a schematic diagram of adjusted non-color image of a first embodiment according to the present disclosure, FIG. 4E is a schematic diagram of adjusted color image of a first embodiment according to the present disclosure, and FIG. 4F is a schematic diagram of final printing image of a first embodiment according to the present disclosure. As shown in FIG. 4D, the adhesive information 42 remains empty upon the multiple adjusted target positions 431 in the adjusted non-color image I3. And as shown in FIG. 4E, the color information 41 increases more color inks upon the multiple adjusted target positions 431 in the adjusted color image I2.

Please refer to FIG. 3 again, after adjusting the non-color image I3 and the color image I2 according to the replacing information 43, the printer 1 combines the adjusted non-color image I3 and the adjusted color image I2 for generating a final printing image (step S22), and then controls the adhesive nozzle 111 to jet the adhesive and controls the color nozzles 112 respectively to jet the corresponding color inks according to the final printing image (such as final printing image I4 shown in FIG. 4F) (step S24).

In particularly, the printer 1 in related art executes printing directly according to the printing image I1 shown in FIG. 2 right after the slice process is completed. As a result, the using amount of the adhesive applied to the internal structure part is much more than that of the color inks applied to the outer contour part.

In each embodiment of the present disclosure, after the slice process is completed, the printer 1 first calculates the replacing information 43, and adjusts the using amount of the adhesive and the color inks according to the replacing information 43, and then generates the final printing image I4 as shown in FIG. 4F. Next, the printer 1 executes printing according to the final printing image I4. As such, the using amount of the adhesive will be reduced and gets close to the total using amount of the color inks. Therefore, the utility rate of the adhesive nozzle 111 is effectively reduced and its life is extended.

Besides, the adjusted target positions 431 indicated by the replacing information 43 in this embodiment basically locate at the internal structure part of the printing layer. As shown in FIG. 4E and FIG. 4F, the color information 41 upon the internal structure part of the adjusted color image I2 is not empty anymore. In other words, the printer 1 will use the adhesive and the color inks alternately when printing the internal structure part of the printing layer. Therefore, the color nozzles 112 can be controlled to jet properly when the printer 1 prints the internal structure part of the printing layer, so the color nozzles 112 can remain wet in order to reduce the probability of being obstructed by the powder 21.

Figure 5:
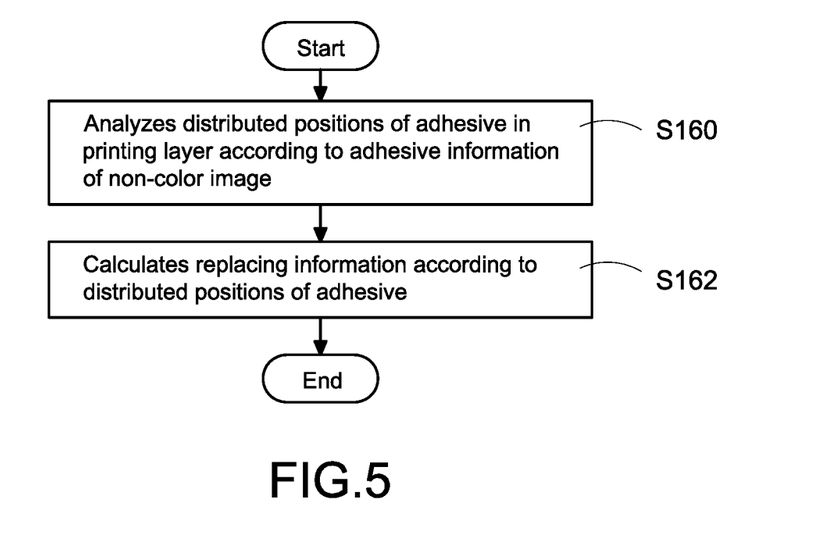
FIG. 5 is a flowchart of generating replacing information of a first embodiment according to the present disclosure.
Figure 6:
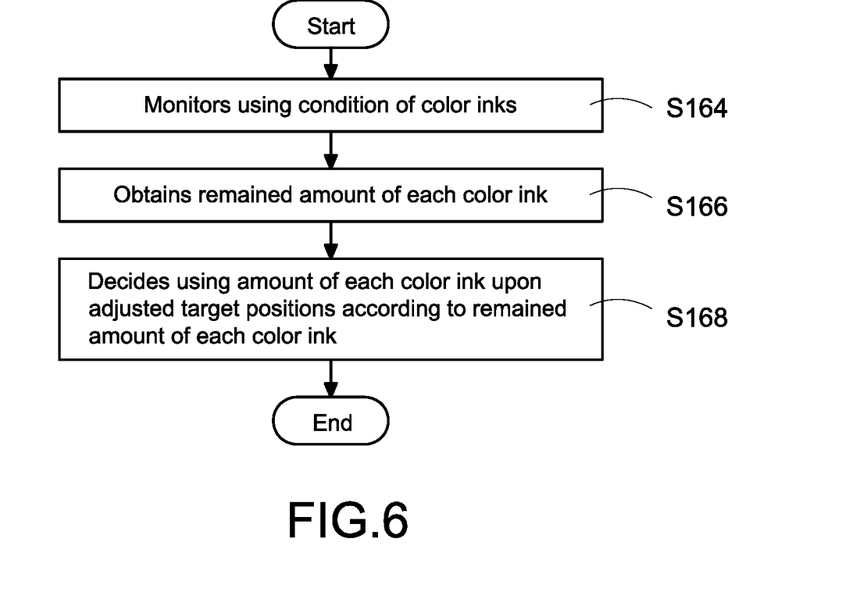
FIG. 6 is a flowchart of generating replacing information of a second embodiment according to the present disclosure.

FIG. 5 is a flowchart of generating replacing information of a first embodiment according to the present disclosure. FIG. 6 is a flowchart of generating replacing information of a second embodiment according to the present disclosure. As shown in FIG. 5, in the aforementioned step S16, the printer 1 analyzes the positions of the adhesive distributed in the printing layer according to the adhesive information 42 of the non-color image I3 (step S160), therefore, the adjusting module can then calculates the replacing information 43 according to the distributed positions of the adhesive (step S162).

In particularly, in the step S162, the adjusting module inputs the adjusting ratio and the distributed positions of the adhesive into the distributing algorithm, so as to calculate the adjusted target positions 431 indicated by the replacing information 43, wherein the adjusted target positions 431 are overlapped with parts of the distributed positions of the adhesive.

As shown in FIG. 6, in this embodiment, the printer 1 also monitors the using condition of the color inks (step S164). For example, it monitors the using condition of cyan ink, magenta ink and yellow ink. Therefore, when adjusting the color information 41 of the color image I2 through the adjusting module, the printer 1 first obtains the remained amount of each of the color inks (step S166), and then decides the using amount of each color ink upon these adjusted target positions 431 according to the remained amount of each color ink (step S168).

Figure 7:
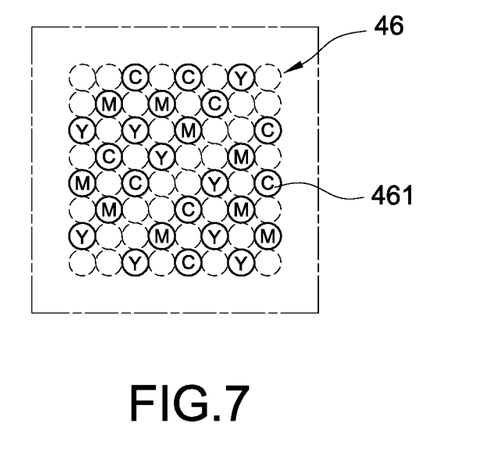
FIG. 7 is a schematic diagram of replacing information of a second embodiment according to the present disclosure.
Figure 8:
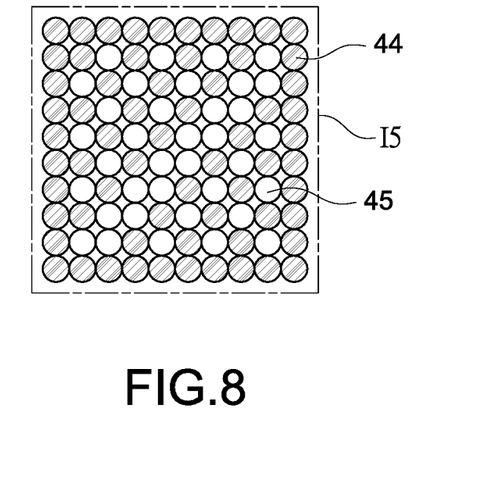
FIG. 8 is a schematic diagram of final printing image of a second embodiment according to the present disclosure.

FIG. 7 is a schematic diagram of replacing information of a second embodiment according to the present disclosure. FIG. 8 is a schematic diagram of final printing image of a second embodiment according to the present disclosure. FIG. 7 discloses other replacing information 46, and the replacing information 46 also indicates multiple adjusted target positions 461. The adjusting module in this embodiment can be set with other adjusting ratio and other distributing algorithm. As a result, the amount and the distributed state of the adjusted target positions 461 in this embodiment may differ from that of the adjusted target positions 431 shown in other embodiments that are calculated by different adjusting ratio and different distributing algorithm.

Furthermore, if the printer 1 is capable of a monitoring function of monitoring the color inks, it can respectively decide the using amount of each of the color inks upon the adjusted target positions 431 according to the remained amount of each color ink as the aforementioned step S168. In the embodiment of FIG. 7, symbol "C" represents positions distributed with cyan ink, symbol "M" represents positions distributed with magenta ink, and symbol "Y" represents positions distributed with yellow ink. However, the above description is just a certain embodiment, and the color inks in the present disclosure are not limited in these three colors.

FIG. 8 discloses other final printing image I5, and the final printing image I5 comprises adjusted color information 44 and adjusted adhesive information 45. As shown in FIG. 8, even the original color image 41 and the original non-color image 42 in this embodiment are the same as that in other embodiments, but in setting different adjusting ratio and different distributing algorithm by the adjusting module, the final printing image I5 in this embodiment will be generated differently. Hence, users are permitted to set a proper adjusting ratio and a proper distributing algorithm by reference to actual requirements, such as remained amount of the adhesive, remained amount of the color inks, using condition of the adhesive nozzle 111, using condition of the color nozzles 112, size of the 3D module, component of the powder 21, etc. Therefore, the life of the adhesive nozzle 111 and the color nozzles 112 can be extended without affecting the quality of the formed subject 22.

It should be mentioned that in one of the exemplary embodiments, the powder 21 is gypsum powder, which is adhesive after absorbing water. Accordingly, though the distributed printing method substitutes the color inks for the adhesive upon the adjusted target positions 431, 461, however, the gypsum powder is adhesive after absorbing the water-based color inks, so the aforementioned substitution will not affect the stabilization of the internal structure part inside the formed subject 22.

In other embodiment, the powder 21 can also be plastic powder or other powder which cannot melt in water. In this case, if the distributed printing method needs to maintain the stabilization of the internal structure part of the formed subject 22 in using these types of powder, colored adhesive may be applied to replace with the aforementioned water-based color inks. Therefore, the color of the powder 21 is changed through these colored adhesive and the powder 21 can also cohere thereto. However, the above description is just a specific embodiment, not intended to limit the scope of the present disclosure.

As the skilled person will appreciate, various changes and modifications can be made to the described embodiment. It is intended to include all such variations, modifications and equivalents which fall within the scope of the present invention, as defined in the accompanying claims.

What is claimed is:

1. A distributed printing method of a powder-bed 3D printer, the method comprising:
   a) generating, by a processor of the powder-bed 3D printer, a color image for a printing layer, wherein the color image comprises color information;
   b) generating, by a processor of the powder-bed 3D printer, a non-color image for the printing layer, wherein the non-color image comprises adhesive information;
   c) calculating replacing information through an adjusting module of the powder-bed 3D printer, and comprising:
   c1) analyzing distributed positions of adhesive distributed in the printing layer according to the adhesive information; and
   c2) calculating the replacing information based on the distributed positions of the adhesive through the adjusting module, wherein the replacing information indicated multiple adjusted target positions, and the adjusted target positions are overlapped with parts of the distributed positions of the adhesive;
   d) adjusting the adhesive information of the non-color image according to the replacing information for generating adjusted non-color image;
   e) adjusting the color information of the color image according to the replacing information for generating adjusted color image;
   f) generating a final printing image via combining the adjusted color image and the adjusted non-color image, wherein the final printing image is used by the processor for respectively controlling an adhesive nozzle of the powder-bed 3D printer to jet adhesive and controlling multiple color nozzles of the powder-bed 3D printer to respectively jet corresponding color inks; and
   g) executing printing according to the final printing image.

2. The distributed printing method in claim 1, wherein the replacing information indicates multiple adjusted target positions, and the step d is to delete parts of the adhesive information upon the adjusted target positions of the non-color image according to the replacing information.

3. The distributed printing method in claim 1, wherein the replacing information indicates multiple adjusted target positions, and the step e is to increase the color information upon the adjusted target positions of the color image according to the replacing information.

4. The distributed printing method in claim 1, wherein the step c2 is to generate the replacing information upon parts of the distributed positions of the adhesive according to a default adjusting ratio through the adjusting module.

5. The distributed printing method in claim 4, wherein the adjusting ratio is one-third of the distributed positions of the adhesive.

6. The distributed printing method in claim 1, wherein the step c further comprises following steps:
   c3) obtaining respectively remained amount of each of the color inks; and
   c4) deciding using amount of each color ink upon the adjusted target positions according to the remained amount of each color ink.

7. The distributed printing method in claim 1, wherein an amount of the color nozzles is three, and the color inks comprises cyan ink, magenta ink and yellow ink.

8. The distributed printing method in claim 7, wherein further comprises a step i) monitoring using condition of the color inks.

9. The distributed printing method in claim 1, wherein before the step a, further comprises a step a0) inputting a 3D module file, wherein the 3D module file comprises a plurality of the printing layers.

* * * * *